United States Patent
Mance et al.

(10) Patent No.: US 8,966,893 B2
(45) Date of Patent: Mar. 3, 2015

(54) SHAPE MEMORY ALLOY ACTUATORS WITH SENSIBLE COATINGS

(75) Inventors: Andrew M. Mance, Royal Oak, MI (US); Martin P. Sulic, Center Line, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 280 days.

(21) Appl. No.: 13/411,848

(22) Filed: Mar. 5, 2012

(65) Prior Publication Data

US 2013/0227943 A1 Sep. 5, 2013

(51) Int. Cl.
*F03G 7/06* (2006.01)

(52) U.S. Cl.
USPC ................. 60/528; 60/527; 427/286; 427/256

(58) Field of Classification Search
USPC .............. 60/527–529; 73/760, 777, 783, 762, 73/767, 775; 118/712; 374/15, 55, 56, 374/101–109, 161–162; 324/207.11–207.26; 356/634; 116/216, 116/204, 209, 211
See application file for complete search history.

(56) References Cited

U.S. PATENT DOCUMENTS

| | | | |
|---|---|---|---|
| 2005/0238503 A1* | 10/2005 | Rush et al. .................... 417/322 |
| 2008/0225575 A1* | 9/2008 | Mullner et al. ................ 365/157 |
| 2008/0312866 A1* | 12/2008 | Shimomura et al. .......... 702/155 |
| 2010/0074608 A1* | 3/2010 | Topliss ......................... 396/133 |
| 2010/0243808 A1* | 9/2010 | Sanderson ................. 244/123.1 |
| 2010/0288635 A1* | 11/2010 | Komiya et al. ............... 204/406 |
| 2011/0000793 A1* | 1/2011 | Kruse et al. .................... 205/50 |
| 2011/0083431 A1* | 4/2011 | Mankame et al. .............. 60/527 |

* cited by examiner

*Primary Examiner* — Thomas Denion
*Assistant Examiner* — Xiaoting Hu
(74) *Attorney, Agent, or Firm* — Reising Ethington P.C.

(57) ABSTRACT

Methods of applying sensible coatings with at least one spatially-varying characteristic to shape memory alloy actuators, particularly actuators comprising linear elements such as wires strips or cables, are disclosed. Such coatings enable the positions of the linear shape memory alloy elements to be sensed using magnetic, capacitive and optical sensors and so, in conjunction with a controller, enable operation of such actuators under proportional control.

20 Claims, 6 Drawing Sheets

SHAPE MEMORY ALLOY ACTUATORS WITH SENSIBLE COATINGS

TECHNICAL FIELD

This invention pertains to shape memory alloy actuators, particularly linear actuators such as wires, strips, or cables, with coatings, which may be patterned or exhibit variable properties, which, when sensed or detected, enable assessment of the operative state of the actuator.

BACKGROUND OF THE INVENTION

Shape memory alloys (SMAs) are a class of metal alloys which may undergo near reversible shape changes so that they may repeatedly be alternated between two shapes for, typically, hundreds of thousands of cycles, without failure. The basis for this behavior is the ability of these alloys to adopt two crystal forms, a higher temperature, relatively strong and stiff form called austenite and a lower temperature, somewhat weaker and more compliant form known as martensite. Transformation from one phase to another induces a strain, typically of less than about 8% or so, which is manifested as a change in length of a shape memory alloy sample as it transitions form one phase to the other.

Shape memory has been observed in a number of alloys including Cu—Zn—Al, Cu—Al—Ni, Ti—Nb, Au—Cu—Zn, Cu—Zn—Sn, Cu—Zn—Si, Ag—Cd Cu—Sn, Cu—Zn—Ga, Ni—Al, Fe—Pt, Ti—Pd—Ni, Fe—Mn—Si, Au—Zd, and Cu—Zn but only a few of these alloys are commercially available. Nitinol, an alloy of nickel and titanium in substantially equiatomic proportion, enjoys the widest use. In most commercial SMA alloys the transition from one crystal structure to the other occurs at temperatures which may range from about −100° C. to +100° C.

In SMA devices, shape changes are effected by a change in temperature sufficient to induce transformation. Often the temperature change is promoted by joule heating induced by passing a controlled electric current though the SMA. During this temperature-driven shape change, the SMA may generate appreciable force and SMAs, commonly in the form of linear elements such as wires and analogous geometries like strips, cables, braids and chains, may be employed as active elements in actuators of various kinds. As an example of the forces which may be developed, a single Nitinol wire, 0.008 inches in diameter may develop a force in excess of one pound. Larger diameter wires or wire bundles may generate greater forces in proportion to the cross-sectional area of the SMA.

Transformation from one crystal structure to another occurs over a temperature range usually of less than 20° C. bounded by a transformation 'Start' temperature and a transformation 'Finish' temperature. The nature of the transformation, martensite to austenite or austenite to martensite is indicated by the resultant phase. Thus the term 'austenite start temperature', generally abbreviated as $A_s$, would indicate that martensite was transforming to austenite. While an SMA is in the transformation range, for example in the temperature range between $A_s$ and the austenite finish temperature, $A_f$, its properties may be approximated by a volume-weighted average of the properties of the individual phases. Hence that transformation promotes a generally continuous and smoothly-varying transition from the properties of the transforming phase to the properties of the transformed phase.

SMA-powered actuators are preponderantly employed in an on-off mode. Typically an SMA wire, or analogous geometry tensile force-generating device, biased by, for example, a spring or similar structure in series with the wire, is maintained in its martensitic crystal structure and deformed by the spring to some suitable predetermined length. This configuration may be maintained indefinitely provided the wire temperature is maintained below the temperature at which austenite is the stable phase. If the wire temperature is increased above the temperature where austenite is the stable phase, $A_f$, for example by passing an electrical current through the wire, the wire will contract. By appropriate choice of biasing spring the force applied by the wire will overcome the force exerted by the biasing spring and contract. By suitably securing one end of the wire and attaching the other end to, for example, a plunger, the plunger may be retracted. When passage of electric current is terminated, the wire will cool to a temperature where only martensite is stable and the wire, on transforming to martensite, will be deformed by the biasing spring and extended to its original length. This process cycle may be repeated for many hundreds of thousands of cycles and is typically performed open loop with no feedback to confirm operation of the actuator. This open loop on-off mode of operation limits the number of applications for such SMA-powered actuators over that of more common mechanical, electrical or electro-mechanical actuators which enable progressive actuation and thus allow for operation under proportional control.

SUMMARY OF THE INVENTION

This invention pertains to the use of generally linear elements, typically in the form of wires, narrow strips, cables, braids, or the like, which function as actuators. In embodiments of this invention the linear elements are formed of a suitable shape memory metal alloy. They may be used in a mechanism in which a body or member of the mechanism is to be moved by the linear element. For example, a NiTi wire is anchored at one end and the other end is attached to the member to be moved. In many embodiments of the invention, the NiTi wire is heated so that it begins to experience a phase change. As the phase change is initiated, causing the wire to change its length (or possibly to deflect), it acts on the member to which it is attached so that the member begins to move. Regardless of the details of the action of the shape memory alloy wire, there is often a need to accurately sense movement of the wire in order to control its actuation function.

In accordance with practices of this invention, a surface of the shape memory alloy actuator is coated with a film of magnetic material, or other suitable sensible material, and a complementary sensor is positioned near a portion of the length of the actuator to sense the signal from the coating material. The sensible coating material is selected and applied so that, for example, its composition and pattern enables a suitably placed sensor and associated controller to recognize the movement and position of the actuator and the body being moved. A communicative signal from the sensor is then used by the controller to manage or control the action of the shape memory alloy actuator. For example, a signal from the position sensor is sent to a suitable controller or control system (such as a computer system) to manage the heating (or other actuation means) of the shape memory alloy actuator member as it performs its function. At a suitable time after its actuation function, the shape memory alloy actuator may be restored to its original shape, ready for a repeated use in the mechanism that it serves.

Particularly the invention pertains to methods of laying down thin film compositions with specified characteristics which may be used to determine the relative or absolute position of the wire. A sensor may be used to interrogate the film. The thin film compositions may be laid down in a spatially varying pattern or a spatially varying thickness or spatially varying composition. Any spatial variation, in thickness, pattern or composition, may be coded to convey, in digital or analog fashion, absolute or relative information on the wire position. Suitably the thin film may be chosen to respond to magnetic sensors, capacitive or resistive sensors, and optical sensors. Any optical sensor may be capable of responding to visible, ultraviolet and infrared radiation with wavelengths ranging from about 100 nanometers to about 100 micrometers.

The film may serve two purposes. First actuator operation would be confirmed; second the actuator may be operated under the direction of a controller, so that the actuator may be operated under proportional control rather than 'on-off' control.

In a first embodiment a shape change memory alloy (SMA) may be coated with any ferromagnetic material either entirely covering the surface or applied to selective regions of the surface. The coatings may be continuous or discontinuous and may vary in thickness or in composition. Suitable ferromagnetic materials may be metals, including Fe, Co, Ni, Cr, Mn, Eu, Dy, and Gd among others, metallic oxides of one or more metallic elements, sulfides, phosphates, phosphides and borides or other such compounds. The material may be magnetized after application, or allowed to remain in its non-magnetically oriented state. Additionally, patterns, gradients of magnetic susceptibility or field strength, thickness changes in the magnetic material, or compositional variations may also be used to sense location.

In a second embodiment a shape change memory alloy (SMA) may be coated with any dielectric material either entirely covering the surface or applied to selective regions of the surface. As in the first embodiment the coatings may be continuous or discontinuous and may vary in thickness or in composition.

In a third embodiment a shape memory alloy (SMA) may be coated with a material which is either more or less reflective than the SMA wire; or a coating which fluoresces; or a coating which luminesces. As in the first two embodiments the coatings may be continuous or discontinuous and may vary in thickness or in composition. The reflective properties of such a coating material may be exploited across the entire electromagnetic spectrum, including the visible, ultraviolet, and particularly the infrared regions of the spectrum. As noted above, a decrease in reflectivity relative to an uncoated wire, which may result through adsorption of the electromagnetic radiation or scattering of the radiation may also be effective in differentiating between coated and uncoated regions of the wire. Optically sensed materials may be applied to the surface or they may be grown as oxide coatings or oxides combined with other elements such as those formed during processes such the formation of conversion coatings.

The coatings described above exhibit characteristic properties sensible by a particular sensor, but it will be appreciated that many coatings may exhibit multiple characteristics, enabling the use of multiple sensors. For example a nickel coating may locally alter the magnetic and optically reflective properties. This multi-sensor capability may be enforced by deposition of multilayer coatings. Such multilayer coatings may also serve to enable yet additional position coding. For example gold is highly reflective in the infrared. Thus if a wire were selectively coated with a ferromagnetic thin film, say of iron, and a gold coating applied in a different pattern, the inputs of a magnetic sensor and an optical sensor may be combined to better locate the wire position. Such an optical sensor may be responsive to any or all of visible, ultraviolet or infra red radiation.

Commercial SMA alloys may be available with austenite finish temperatures of from about from −25° C. to about 120° C. But, in many applications, an actuator SMA wire composition is selected which maintains its low-strength martensitic state at ambient temperatures of about 25° C. or so. When heated above at least its austenite start temperature the wire will at least partially transform and contract. In most actuators one end of the wire is permanently secured to a support while the other is connected to a device. Such a device may undergo rotary or linear motion. Examples of such linear motion devices include a plunger, a vehicle air dam or a vehicle air deflector. In such linear devices, a linear SMA actuator arranged with one end secured to a support and the other end attached to the device, any contraction of the wire will act directly on the device and serve to displace and reposition the device. Commonly wire contraction results from heating of the wire occasioned by passage of an electrical current through the wire. The current should be selected to maintain the wire at a temperature where austenite is stable. A stable temperature may be achieved by balancing the heat input with thermal losses from the wire due to conduction, convection and radiation. Preferably such a stable temperature only minimally exceeds the $A_f$ temperature of the wire alloy.

The sensible wire coating may enable determination of wire position. Such determination may be relative, that is, reflect the change in wire position from a known wire reference position, or absolute, that is reflect the wire position relative to a fixed external reference. The reference is the location of the secured end of the wire, often the actuator housing. Determination of the wire position may enable confirmation of device actuation and may be used to enable proportional control of device deployment. A controller may adjust the magnitude of the electrical current passed through the wire responsive to the sensed wire, and hence device position. The wire may be maintained at a temperature between its $A_s$ and $A_f$ temperatures so that only partial device deployment may be stably maintained. The controller, responsive to a control signal, may adjust the current to increase or decrease device deployment as required.

BRIEF DESCRIPTION OF THE DRAWINGS

FIG. 1A shows the actuator with the SMA wire in its martensitic state; FIG. 1B shows the SMA wire in its austenitic state; and FIG. 1C shows the SMA wire after reverting to its martensitic state after cooling from the austenitic state of FIG. 1B.

In FIG. 5A the actuator is shown in a configuration in which the airflow control device is retracted; in FIG. 5B the actuator is shown in a configuration in which the airflow control device is deployed.

FIG. 6A illustrates the wire in its martensitic state and FIG. 6B illustrates the wire in its shortened austenitic state.

DESCRIPTION OF PREFERRED EMBODIMENTS

Of the numerous alloys in which shape memory effects have been demonstrated, the most commonly-used alloys are those based on near-equiatomic compositions of nickel and titanium, generically described as Nitinol. Cu—Al—Ni and Cu—Zn—Al are also commercially available but their use is less widespread.

Many of the applications for shape memory alloys relate to mechanisms and devices in which the ability of a shape memory element to adopt two shapes is exploited to enable an actuator. Commonly wires, or other elongated, tensile load bearing shapes, such as strips, cables, braids and chains, may exhibit a recoverable strain of up to 8% while exhibiting appreciable force. But, in practice the operating strain is often de-rated to about 5%-7% or so to assure reliable operation of the actuator over up to a million or so cycles. The actuator may be a latch or a device for deploying a reconfigurable structural element, such as an air dam on a vehicle or a tunable, reconfigurable antenna.

Figure 1A:
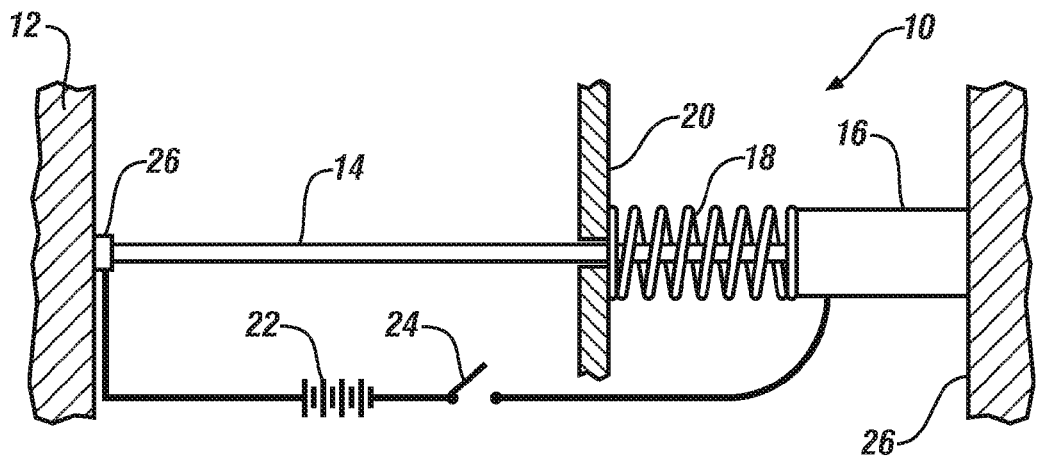
FIGS. 1A-C show a representative SMA wire actuator under three operating conditions.
Figure 1B:
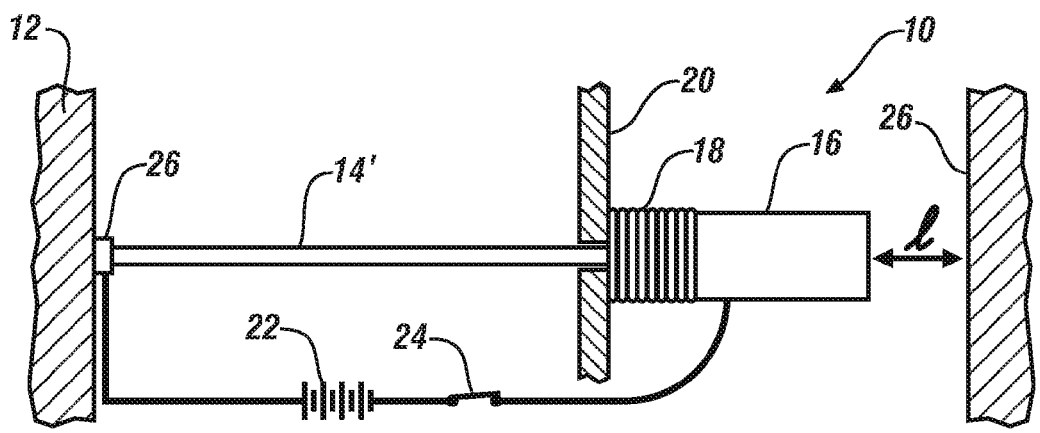
Figure 1C:
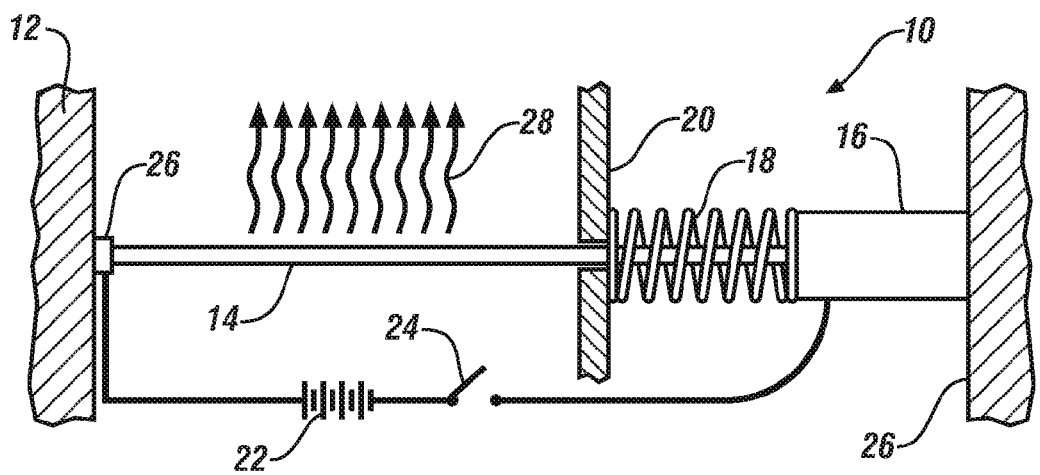

A representative, but generic actuator is shown in FIGS. 1A, 1B and 1C. Here SMA wire 14, or other SMA form suited for imposition of tensile loads, is secured at one end to support 12, and, at its other end, to one end of plunger 16. The maximum extension of plunger 16 is limited by stop 26. Plunger 16 is electrically conductive and the SMA wire is secured to plunger 16 by some means, such as crimping or soldering which enables electrical conduction between plunger 16 and SMA wire 14. SMA wire 14 passes through bulkhead 20, which is electrically isolated from SMA wire 14, and compression coil spring 18. One end of spring 18 is in contact with an end of plunger 16 while the other end of spring 18 contacts, and is supported by bulkhead 20. Battery 22 is connected to SMA wire 14 through connector 26 and to one contact of switch 24. The other contact of switch 24 is connected to (electrically conductive) plunger 16. Hence by closing switch 24 an electric circuit is established which permits passage of current along the length of SMA wire 14. The power source is depicted in FIGS. 1A-1C as a battery. This is illustrative and not limiting and other electrical power sources including those suited for providing alternating current, direct current and pulse width modulated direct current may be employed with equal utility. The primary requirement is that the average power provided be adequate to increase the wire temperature above its $A_f$ temperature under conditions of thermal loss. As shown in FIG. 1A, SMA wire is in its low temperature martensitic crystal structure form and may be deformed (elongated) by the action of spring 18 which extends, displacing plunger 16 away from bulkhead 20 until plunger 16 contacts stop 26. In FIG. 1B, switch 24 is closed allowing electrical current to flow from battery 22 and through SMA wire 14, heating the wire. When the temperature of wire 14 exceeds the martensite to austenite transformation temperature, the SMA wire will begin to transform to austenite and, as it does so, will seek to shrink or reduce its length, opposed by spring 18. By appropriate choice of the strength of spring 18, the compressive stresses imposed by the now-austenitic, stronger wire 14, collapse spring 18, allow plunger 16 to retract by some distance l. The maximum attainable retraction l will depend on the length of the wire, the maximum strain achievable with the particular SMA alloy used and any de-rating of the actuator strain based on the required or anticipated number of extension-retraction events.

In FIG. 1C, switch 24 is opened and SMA wire 14 begins to lose heat 28 to its surroundings, lowering its temperature. As the wire temperature falls below the austenite to martensite transformation start temperature, the wire begins to transform to the lower-strength martensite. As it does so, the martensite is deformed by spring 18 which extends, advancing plunger 16 as it does so until the entire length of SMA wire 14 has transformed and the extension of spring 18 is terminated by contact of the end of plunger 16 with stop 26.

Figure 2A:
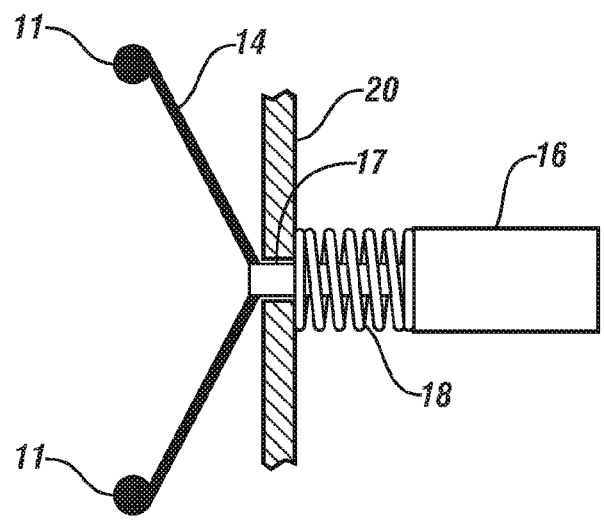
FIGS. 2A and 2B show a second design of an SMA wire actuator in its martensitic (FIG. 2A) and austenitic states (FIG. 2B).
Figure 2B:
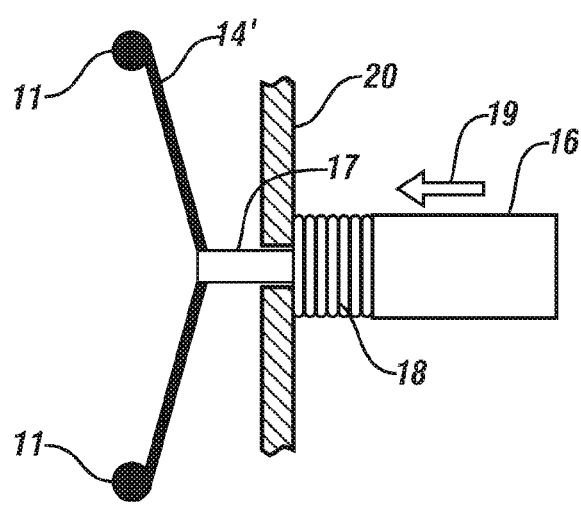

An alternative design for such an actuator is shown in FIGS. 2A and 2B. In this 'bowstring' configuration, SMA wire 14 is secured at its ends at fixed posts 11 and secured to one end of support 17 which, in its turn, is secured to plunger 16. Compression spring 18, sandwiched between bulkhead 20 and plunger 16 is suitably robust to deform wire 14 in its martensitic form and deform wire 14 into a bowstring configuration and urge plunger 16 away from bulkhead 20 as shown in FIG. 2A. On heating wire 14 into its austenite phase 14' as shown in FIG. 2B, wire 14' seeks to become shorter, and straighter, and in so doing retracts plunger 16 in the direction of arrow 19, overcoming the force exerted by spring 18.

Devices such as those shown in FIGS. 1A-1C and 2A-2B, among others, operate due to the reversible change in length of an SMA wire as it transitions from martensite to austenite and back to martensite. Such devices may be designed and constructed to iterate through this sequence of events for hundreds of thousands of cycles.

It will be appreciated that the maximum force which may be applied by such a device may be increased by increasing the wire diameter, or, more preferably, by bundling a number of wires together. The maximum achievable displacement may be increased by increasing the length of the wires. In large-displacement devices, requiring long lengths of SMA wire, the SMA wires may be wrapped around pulleys or otherwise packaged to enable a more compact device.

Figure 3:
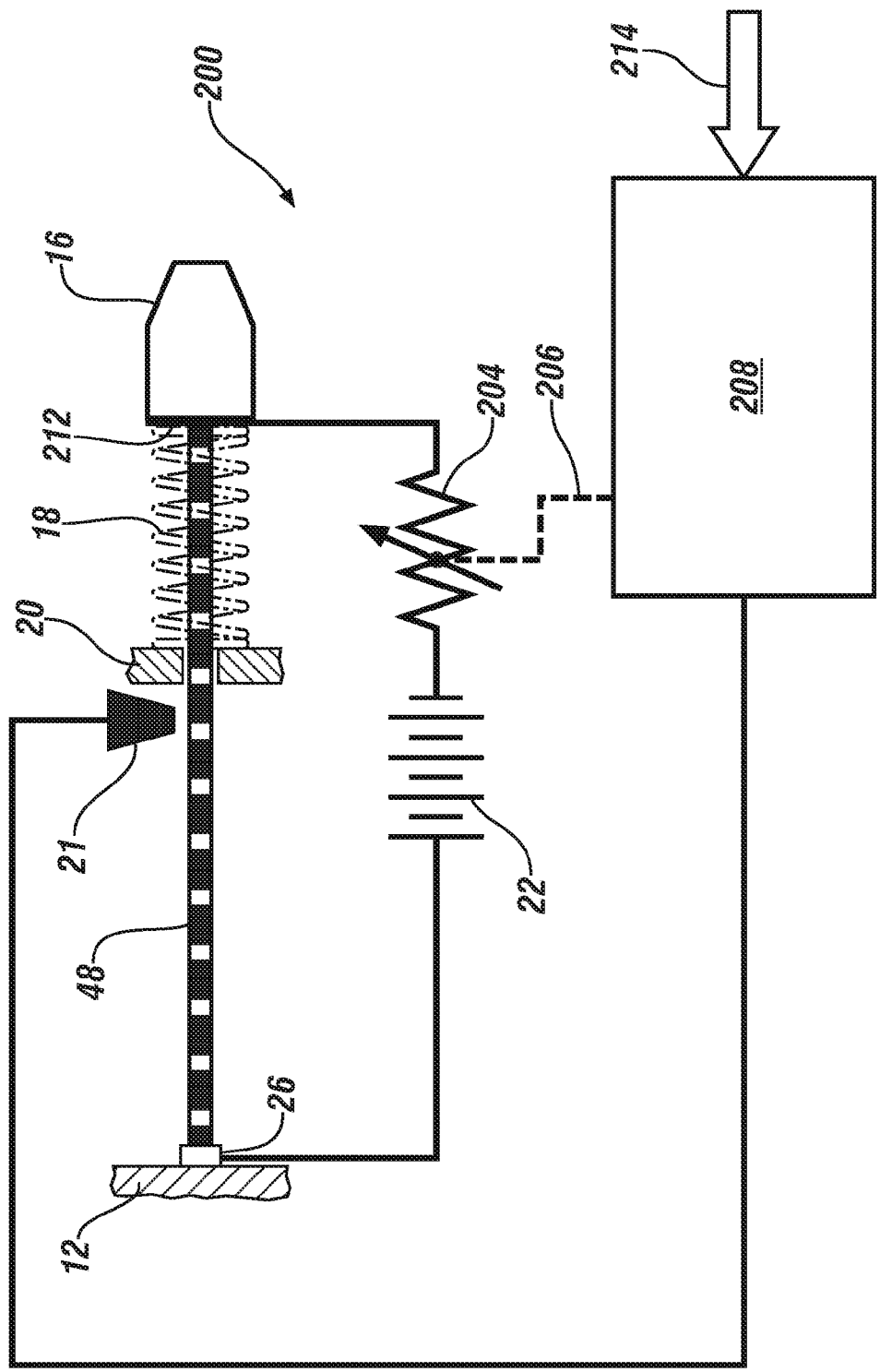
FIG. 3 shows a simplified representation of a controllable SMA wire-powered actuator, derivative of FIGS. 1A-C.

The devices shown in FIGS. 1A-C and 2A-2B are representative of the operating principle of a broad class of shape memory alloy actuated devices which operate, consistent with the above description, as simple on-off devices. It is an object of this invention to enable such a device to operate under closed loop control. This may be accomplished with the arrangement of FIG. 3 which is derivative of FIGS. 1A-C. In FIG. 3, coated SMA wire 48 of controllable SMA actuator system 200 has been coated with a coating which is compatible with, and may be sensed by, sensor 21. Suitably the coating has been patterned so that movement of wire 48 under sensor 21 during actuator operation will result in sensor 21 outputting an electrical signal, or a sequence of electrical signals, which depends on the extent of wire movement. The output of sensor 21 is conveyed to controller 208 by wire connection, as shown, or wirelessly or other non-wired communication means (not shown). The controller may interpret the sensor signal or signal sequence to determine the position of wire 48, and so the position of plunger 16, and compare this position with a commanded or preferred wire 48 position indicated by controller input 214. Controller 208 may then, based on any differences between the commanded and sensed plunger position, control the current flow from battery 22 by adjusting the setting of a current-control device, here shown without limitation or restriction as a variable resistor 204, through control signals conveyed through connection 206. Connection between the power supply, here battery 22 and wire 48 is effected through connectors 26 and 212.

Of course alternate power sources (other than battery 22) and alternate schemes for varying the power input to wire 48 (other than variable resistor 204) may be employed without limitation. For example alternating current power supplies may be used and alternate circuits and circuit devices, including solid state switches such as thyristors, triacs and Insulated gate bipolar transistors (IGBT) may be used. One convenient approach may be to use pulse width modulation where command 206 modifies the time duration of a current "on" pulse, relative to the duration of a current "off" pulse to raise or lower the average current passed through the SMA wire.

Figure 4:
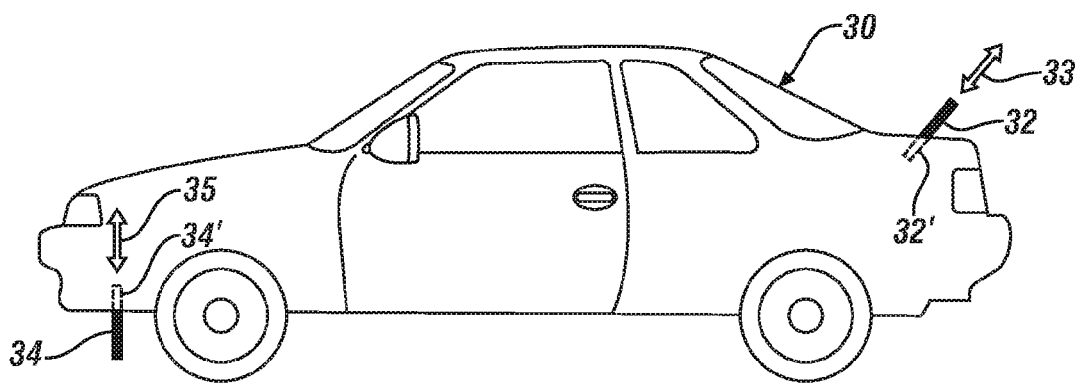
FIG. 4 is a side view of an exemplary vehicle with deployable airflow control devices shown in their deployed configuration.

A possible application for such an actuator is to deploy on-demand vehicle airflow control features such as rear spoiler 32 and front air dam 34 of vehicle 30 shown in FIG. 4. Such airflow control features were originally found primarily on higher performance vehicles but one or both are now commonly found on vehicles of more modest performance. At high speeds, adding a rear spoiler may delay flow separation of the air moving across the roof at the rear window. Such flow separation would create a low-pressure zone and induce increased drag and reduced fuel economy. An air dam serves to reduce the amount of air flowing underneath the vehicle which reduces aerodynamic lift and improves vehicle handling, particularly at high speeds.

Air dams and spoilers are commonly fixed and therefore incapable of adapting to changes in vehicle operating conditions and associated airflow patterns although, recently, deployable units capable of switching between a stored and operating configuration have seen increased usage. For example, in FIG. 4, rear spoiler 32 may be reversibly deployed, as shown, or withdrawn from the airflow by retracting into recess 32' in the direction indicated by arrow 33. Similarly air dam 34 may be reversibly deployed and retracted into recess 34' in the direction of arrow 35. An exemplary SMC-based actuation device for such airflow control devices, here shown in configuration for application to a rear spoiler is shown in stored and deployed configuration in FIGS. 5A and 5B respectively.

Figure 5A:
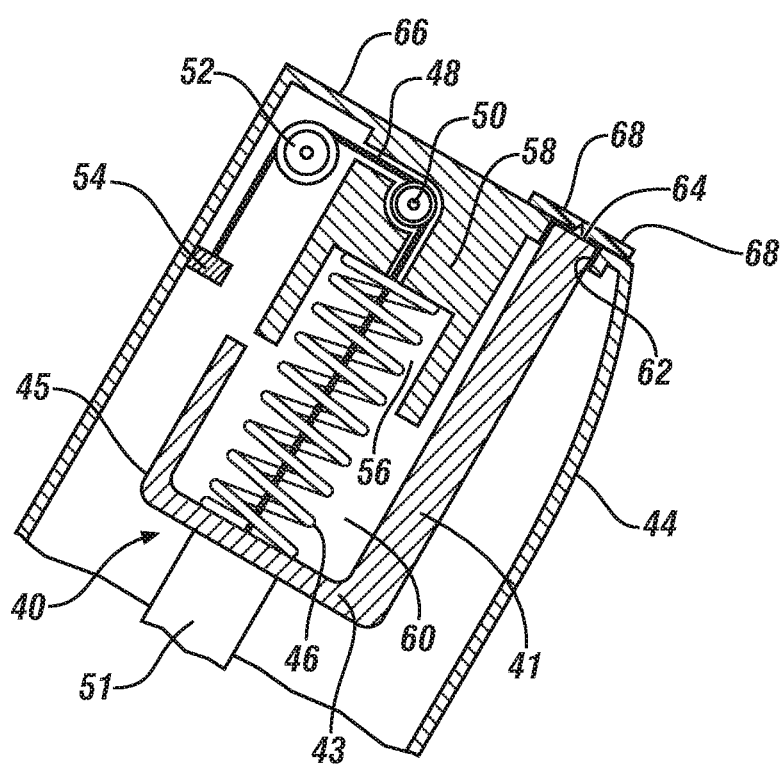
FIGS. 5A-B are cross-sectional views of an SMA actuator and airflow control device suitable for deploying one or both of the vehicle airflow control devices shown in FIG. 4.

FIG. 5A is illustrative of a cross-section of an actuator 40 with a deployable air flow control device 41 contained within a housing 44 and maintained in a retracted configuration by the action of coil spring 46, acting on SMA wire 48. Airflow control device 41 is attached to legs 43, and 45, the combination of 41, 43 and 45 having, in section, a shape generally resembling the letter 'J'. Leg 41 is intended for insertion into the vehicle airstream (not shown) and legs 43, 45 are structural elements for enabling operation of the device as will be described shortly. The extent of retraction of air flow control device 41 is limited by stop 51 which interacts with leg 43.

SMA wire 48 in its martensitic form, generally passes along the cylinder axis of biasing coil spring 46 and passes around pulleys 50 and 52 adopting a generally 'U-shaped' configuration and terminates at block 54. The U-shaped configuration adopted by SMA wire 48 enables a more compact actuator design but it will be appreciated that the same operational characteristics may be obtained with a simple linear SMA device like that shown in FIGS. 1A-C.

Block 54 may either be a termination of SMA wire 48 which may be fixedly attached to housing 44 or block 54 may be an integral feature of housing 44 with suitable provision for accommodating and securing the end of SMA wire 48. One end of spring 46 is located in and constrained by pocket 56 formed in boss 58 of housing 44 and the other end of spring 46 is restrained by the open channel 60 formed by legs 41, 43 and 45.

Leg 41 is sized to slidably engage opening 62 of housing 40 so that the end 64 of leg 41 may, when deployed, extend beyond the outer surface 66 of housing 44. Optionally flexible lips 68 may be positioned along opening 62 of housing 44 to prevent or limit ingress of moisture or debris.

Figure 5B:
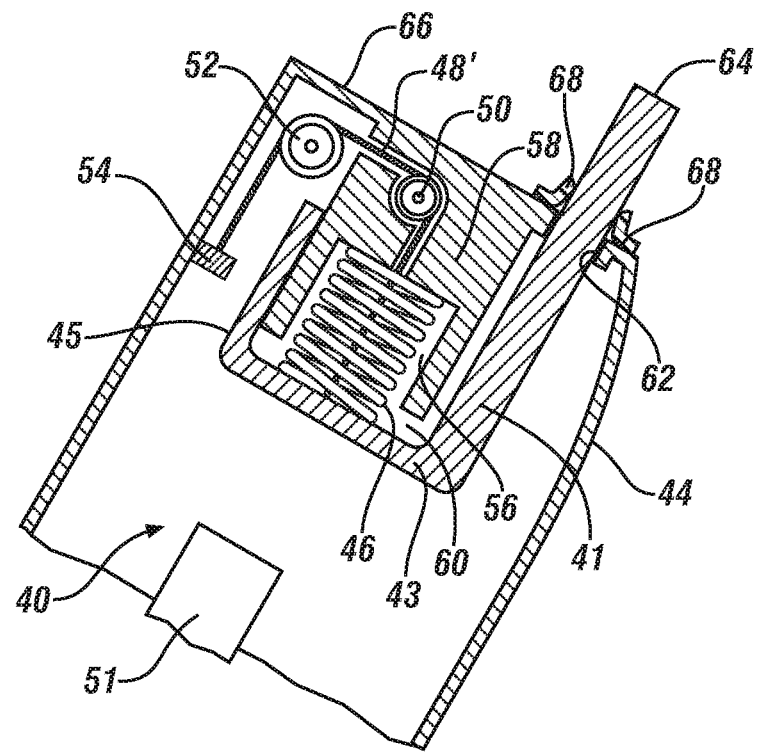

When deployed, as shown in FIG. 5B, SMA wire 48' is heated and transformed to austenite, and in transforming contracts to apply a force to leg 43 which exceeds the force applied by biasing spring 46, collapsing coil spring 46 and moving airflow control device off stop 51 and enabling leg 41 of device 40 to push aside flexible lips 68 and extend beyond surface 66 of housing 44. For simplicity no heating means is shown but it will be appreciated that the joule heating procedure described previously could be employed. Alternatively, cartridge or other heaters may also be effective although their response may be slower than desired.

The operation of either of the actuators shown in FIGS. 1A-C and 5A-B is conducted open-loop under On-Off control. Although SMAs are very robust and failure occurs infrequently, it would be desirable to incorporate feedback, such as the scheme shown in FIG. 3 so that the position of the SMA wire, and of the plunger or airflow control device attached to the actuator may be independently assessed.

This position information may be used to limit the wire temperature to only minimally greater than its $A_f$ temperature. The heat supplied to the wire, commonly by passage of electric current through the wire, should be sufficient to maintain the wire temperature above its $A_f$ temperature. The wire will experience some thermal losses, primarily due to convection, but also due to conduction and radiation. If the wire is positioned in an airflow, losses due to forced convection may also occur. Because, under open-loop control, the extent of these losses may not be known with great precision, the applied current is commonly chosen to maintain the wire temperature above $A_f$ even under aggressive cooling. So the wire temperature, under many operating conditions where less aggressive cooling obtains, is significantly greater than $A_f$, promoting oxidation and premature wire failure. These issues may be exacerbated in assemblies where the wire is embedded in a polymer. The polymer may suffer thermal degradation from any excess temperature and, if the wire is bonded to the polymer, the bond may be degraded by excess temperatures. By operating under closed loop control with knowledge of the wire position, lower currents with lesser potential for overheating the wire may be employed.

Further with knowledge of the state of the wire, proportional control may be feasible so that actuation, for example of the airflow control devices of FIG. 4, may be incremental, responsive to minor changes in vehicle speed and airflow, rather than fully deployed when a particular deployment threshold is crossed. Progressive actuation of the actuator is made feasible by the progressive nature of the transformation and its occurrence over a range of temperatures between, in the case of an SMA actuator, $A_s$-$A_f$.

Since transformation is induced by electrical heating, the applied current may be adjusted so that at a desired degree of transformation, the heat provided to the wire by the electric current just equals the heat lost to the environment so that the wire is maintained at a wire temperature corresponding to a desired extent of transformation. The extent of transformation will correspond to an extent of contraction of the wire and so, to an extent of deployment of a plunger or airflow control device. Thus by sensing the wire extension/contraction the electric current fed to the wire may be controlled to enable progressive deployment of the airflow control device. Of course, sensing any failure of the wire to contract may serve to indicate a system deficiency, for example a failure of the power supply passing current through the wire or a jammed airflow control device, perhaps resulting from ice buildup.

Figure 6A:
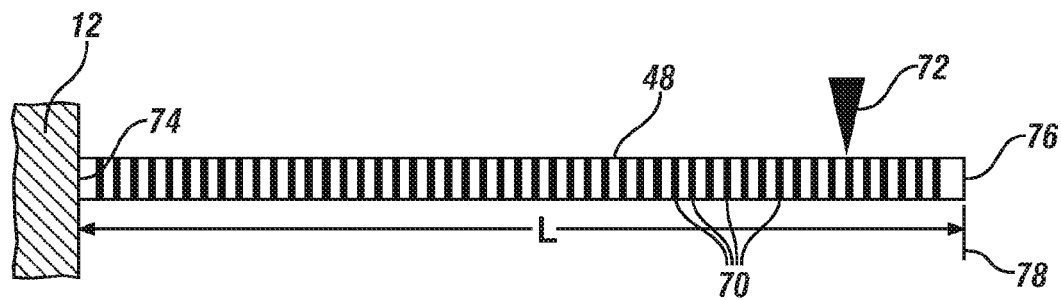
FIGS. 6A and 6B illustrate the manner in which the change in length of a patterned SMA wire may be detected using a detector.
Figure 6B:
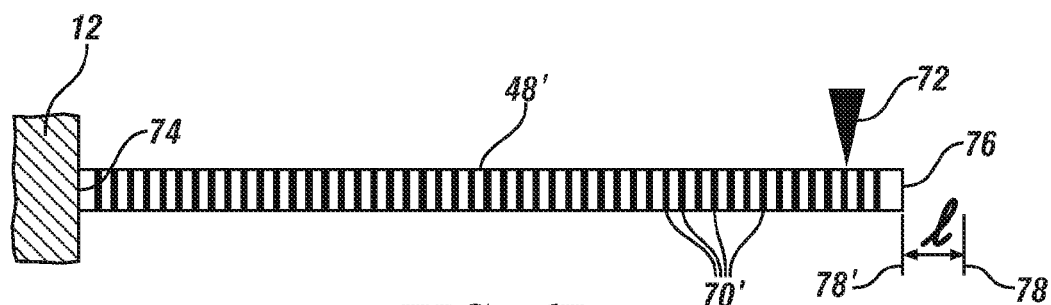

FIGS. 6A and 6B are illustrative of an embodiment of the invention. Martensitic wire 48 with uniformly-spaced circumferential markings 70 (FIG. 6A) transforms to its austenitic state 48' (FIG. 6B). In transforming, wire 48 undergoes a length change of (say) 7%. Since one end 74 of the wire is fixedly attached to support 12, end 76 of the wire will be displaced by an amount l, generally equal to 7% of the wire length L, moving from location 78 to location 78'. Hence a sensor 72 may record the passage of some number of markings 70 as the wire 48 shrinks and, if sensitive enough, may also record a similar 7% or so reduction in the width of markings 70' relative to markings 70. Of course, sensor 72 may be positioned at any convenient location. But the extent of the wire contraction is proportional to the distance between support 12 and the sensor 72. Thus locating sensor 72 closer to support 12 will reduce the magnitude of the contraction, requiring greater sensor sensitivity and sensor noise immunity, and more closely spaced markings for similar measurement accuracy. Also, the wire is used to actuate a device, such as airflow control device 40 (FIG. 5A) so it is the position of the device which should be controlled. Hence measuring wire displacement at some location other than proximate to the point of attachment of the wire to the device requires appropriately scaling any sensed wire displacement to determine the device displacement. For these reasons it is preferred to measure wire displacement proximate to the point of attachment of the wire to the device so that the wire displacement may be substantially equivalent to the device displacement.

Figure 7:
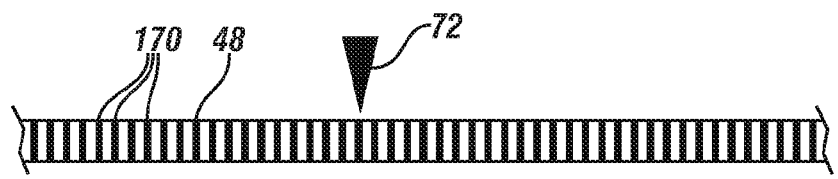
FIG. 7 shows a patterned SMA wire suited for relative position determination.

In FIGS. 6A and 6B, the markings 70, 70' were shown as disposed along the length of the wire, but clearly this is unnecessary. With a wire length change of 7% or less, representative of commonly available SMA compositions, the majority of the markings never pass under the sensor and are never interrogated or detected. So it is sufficient to concentrate the markings only in that portion of the wire which, in operation of the wire, may be interrogated by the sensor. The markings may enable relative positioning or absolute positioning. For example, the uniformly-spaced circumferential markings 170 applied to wire 48 as shown in FIG. 7 enable relative positioning. Contraction of wire 48 will result in a series of markings 170 passing under sensor 72. If sensor 72 detects a series of markings then operation of the device may be assumed and, by counting the number of markings which pass under the sensor the travel of the wire may be estimated and compared to the designed travel. Such an arrangement will not however determine the absolute position of wire 48 or of any actuator, plunger or similar device to which it may be attached unless the starting location is known. By varying or coding the markings, absolute position information may be obtained. In the exemplary coding scheme shown in FIG. 8, a section 100 of a wire, such as 48 in FIG. 7, which will be 'seen' by the sensor has been suitably scaled to the intended displacement of the wire and, by way of example only, subdivided into 12 portions. Each of the 10 lettered portions A-K is of substantially equal length and each portion consists of a marked segment 90 and an unmarked segment 92 as shown at portion A and portion H for example. The lengths of the marked segments are scaled linearly so that marked segment 90 of portion A, the first portion, is $\frac{1}{10}$ of the portion length and marked segment 90 of portion H, the seventh segment, is $\frac{7}{10}$ of the portion length. Of course, the unmarked segments of each portion are complementary in length to the marked portions. Lead segment 80 may be uniquely identified by having a group of three equally-spaced markings while end segment 82, also with a group of three equally-spaced markings, may be distinguished from lead segment 80 by the greater width and spacing of the markings Thus, at the outset of the wire contraction the sensor should sense the three narrow, substantially equally-spaced markings of lead segment 80, then, with further contraction, segments A-K in progression and, at the end of the wire contraction, end segments 82. However unlike the substantially equally-spaced markings of FIG. 7 the wire position may be known, to within the precision of the marked segment 90 or the complementary unmarked segment 92 of a particular portion A-K. The coding scheme shown and described, is of course only illustrative of an acceptable encoding scheme and other schemes, for example, based on binary encoding or bar coding or any other suitable approach may be employed without limitation.

Any discrete coding scheme may only be accurate to within the scale of the largest detectable feature. It may therefore be preferred to adopt a coding scheme in which small coding features are located in a known preferred operating regime. In general however the scale of the features will be small so that any imprecision in location may be minor. For example, consider an SMA wire 200 millimeters in length. A 7% length reduction corresponds to about 14 millimeters, or, under the just-discussed 12 segment scheme, about 1 millimeter per segment or a maximum positional uncertainty of about ±0.5 millimeters or so, corresponding to about ±4% or so. If this is unacceptably large, a continuously variable coating may be used as described below.

Sensing may be continuous or periodic. However, if periodic the sampling rate must be selected to be much less than the time required for the smallest sensible feature to pass through the field of view. The greater the sampling rate the greater the accuracy of the assessment of the feature pulse duration.

Provided the rate of extension or contraction of the wire is uniform, the rate at which the wire passes the sensor will be constant and the time duration of a pulse will be proportional the length of the marking. If the rate is not uniform, but is accelerating or decelerating, the known lengths of individual segments may be used to estimate the acceleration and correct the time duration to again extract segment length information from the time duration of the pulses. Note that because the rate of extension or contraction of the wire is not known a priori, absolute measurements of the length of an unknown marked or unmarked segment are not immediately feasible. However once a position determination is made, the rate may be estimated so that the segment lengths may be estimated. These estimated lengths may be compared to their known length in the martensitic state to confirm that they have undergone the expected contraction in length.

Either an absolute or relative positioning scheme may be used for proportional control, but absolute encoding, because it enables more rapid recovery from a momentary data loss may be preferred. If data is briefly interrupted, under a relative positioning approach a controlled wire contraction may only be re-instituted after the SMA wire is first reset to a known operating point—either fully contracted or fully-extended—to establish a reference. With absolute positioning the SMA wire may be readily reset to a desired wire contraction by dithering the wire position sufficiently for the sensor to sample, at most, 3 segments and re-establish its position. By scanning three segments a controller may estimate velocity and acceleration and again estimate segment length based on pulse duration.

Sensor 72 may be any sensor capable of detecting the presence or absence of a coating on the wire. Suitably sensor 72 may respond to the magnetic properties or a coating, the dielectric properties of a coating or the optical properties of a coating. For example a magnetic sensor may be employed to detect differences in the ferromagnetic properties of the wire surface, an optical sensor may be employed to detect differences in reflectivity of the wire surface and a capacitive sensor or resistive sensor may be employed to detect differences in the dielectric properties of the wire surface. Typically however, since a capacitive measurement may be made without coating- (or wire-) sensor contact, capacitive measurements are preferred over resistive measurements. In each case, the surface properties of the wire may be selectively modified by applying a patterned coating to the surface which selectively modifies the sensed property.

The procedure may be illustrated using the following exemplary procedure for deposition of ferromagnetic material on an Ni—Ti wire through electroless metallization or by electroplating. Because Ni—Ti readily develops an adherent surface oxide, an aggressive procedure for removal of surface oxides, would precede any coating steps. Such a robust procedure may not be required for other SMA alloys.

A suitable procedure for removing the oxide layer includes cleaning and degreasing the wire using first a dry wipe using a lint-free paper towel then wiping with acetone, 2-propanol, and finally xylene. The wires are then air-dried and rinsed with deionized water and maintained wet until the procedure is complete and the deposit has been laid down on the wire surface. The wires are then immersed for 20 minutes in a chemical etch solution consisting of an aqueous solution of 3% hydrofluoric acid and 15% nitric acid (each by volume) followed by two successive dips in deionized water rinses.

The cleaned and etched, oxide-free wire samples are then immersed in an aqueous 1% to −5% (by weight) $PdCl_2$ solution for 10-120 seconds, removed and dipped in two successive deionized water rinses. The wires are then placed in an electroless cobalt bath, which deposits a ferromagnetic cobalt-phosphorus, Co—P, mixture, for 10-120 seconds, removed and dipped in two successive deionized water rinses and then air dried.

A suitable electroless cobalt bath may be prepared by adding, to a liter of water: 24 grams cobalt sulfate pentahydrate, $CoSO_4.5H_2O$; 70 grams sodium citrate, $Na_3C_6H_5O_7$; 20 grams sodium hypophosphite, $NaH_2PO_2.H_2O$. The pH may be adjusted to 8.5 with dilute sodium hydroxide. A suitable operating temperature of the solution is between about 80° C. and 95° C. The total deposition time to achieve a deposit of acceptable thickness is less than about 40 minutes.

On first contact with the cobalt-containing bath the wire should form the cathode of an electrochemical cell. An electric current was briefly applied for a few seconds and the current was discontinued and Co—P deposited for approximately 20 minutes. At this point the wire is removed from the solution, rinsed with deionized water, and allowed to dry in air.

Other ferromagnetic coatings may be employed. Electroless Co and Ni may be electrolessly deposited using baths and compositions like that described above. The Co and Ni deposited from such baths may be in a relatively pure state, or mixed with other elements, typically boron and phosphorus. Coatings of nickel, cobalt, and iron, or alloys of those elements, with or without phosphorus or boron, can be formed using electrodeposition. Where alloys are formed, the coating composition should be selected to be ferromagnetic. Procedures and processes for such electrodeposition are well known to those skilled in the art.

SMA may also be coated with a magnetic layer by applying a paint containing particles of a ferromagnetic metal or compound, or by applying, as an ink, precursors that form a ferromagnetic metal or material upon firing. Formate salts are suitable precursors. A similar procedure involves applying a coating comprising a solvent with dissolved soluble precursors which will yield a metal upon firing in a reducing atmosphere or an oxide when fired in air or oxygen. Vacuum deposition, or plasma, and flame coating may also be used.

Figure 8:
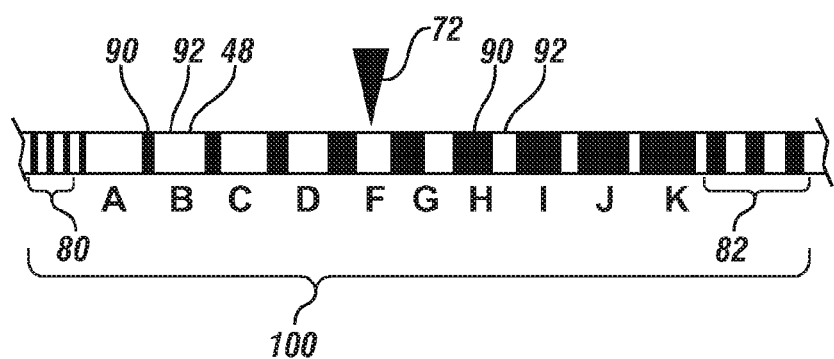
FIG. 8 shows a patterned SMA wire suited for absolute position determination.

Although in the example given, a continuous portion of the wire was coated, by selectively masking the wire a patterned coating, like that shown in FIGS. 7 and 8 may readily be applied. Similarly by using a multistep process with intermediate masking, multi-thickness layers may be produced.

Figure 9:
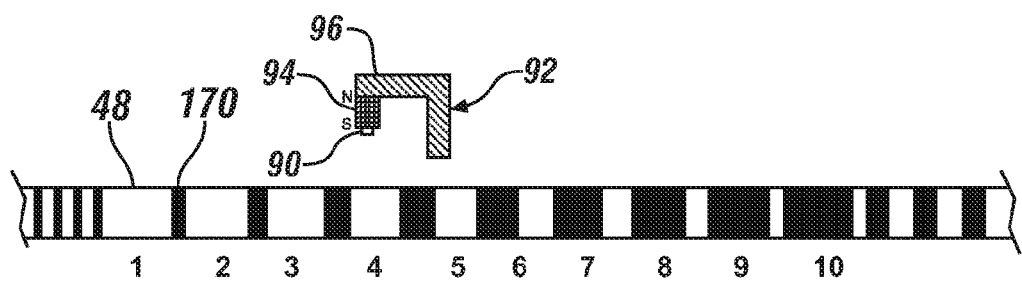
FIG. 9 shows the patterned SMA wire of FIG. 8 and a representative magnetic sensor.

For the example given, the local magnetic properties of the coated wire may be sensed using a magnetic sensor such as is shown at 92 in FIG. 9. Here a sensor, for example a magneto-resistive sensor 90 is placed in the flux of a magnet, or electromagnet 94 attached to structure 96 which provides a flux return path. The varying magnetic character of the coated and uncoated wire segments will induce differing responses in the magneto-resistive sensor 90 to generate a train of pulses mapping the coating pattern on wire 48. For best signal to noise ratio the coating applied to segment 170 should be ferromagnetic but a paramagnetic coating whose magnetic properties differ detectably from the paramagnetic properties of the wire may also be suitable.

Figure 10:
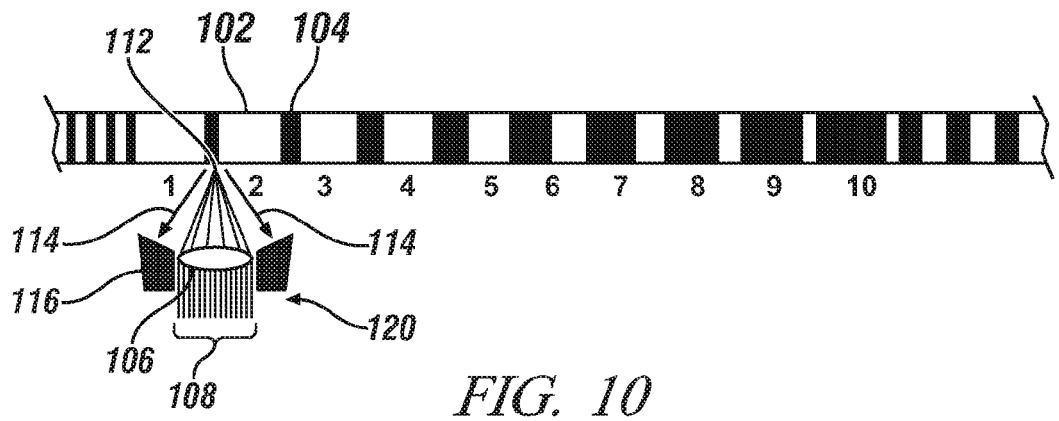
FIG. 10 shows the patterned SMA wire of FIG. 8 and a representative optical sensor.

In a separate embodiment shown in FIG. 10, the individual coding segments may have differing optical reflectivities in any portion of the electromagnetic spectrum. For example, reflective coating 102 may be a coating of bright chromium or other suitable material while absorptive coating 104 might be the naturally-occurring oxide on Ni—Ti. Here, in an exemplary light source/sensor 120, light rays 108 from a suitable source (not shown) are focused by lens 106 to a small diameter light probe 112 at the wire surface. Some of the incident illumination is scattered and reflected as rays 114 which are captured by detector 116, here shown, without limitation, as an annular detector surrounding lens 106. Detector 116, which may be a photodetector, will, in response to the differing reflectivities of the wire surface, again output a train of pulses which maps to the surface pattern.

Figure 11:
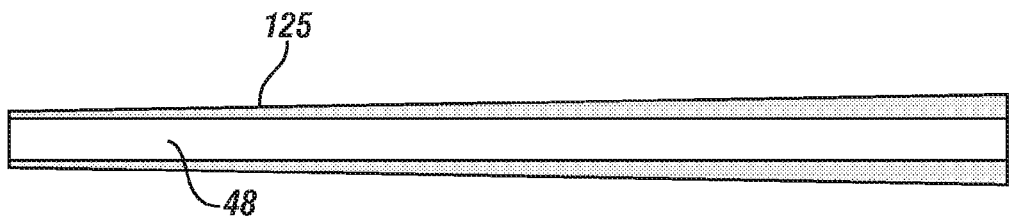
FIG. 11 shows an SMA wire with a continuous coating of variable thickness.
Figure 12:
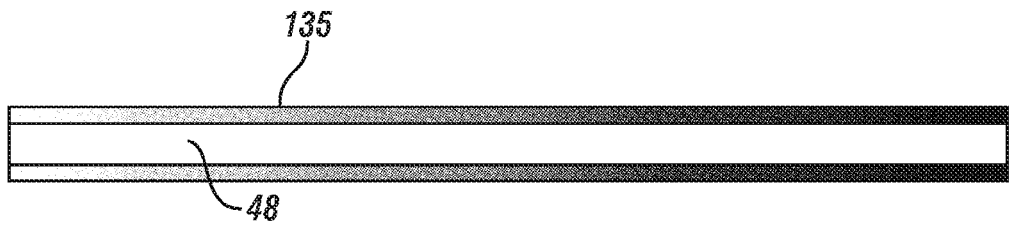
FIG. 12 shows an SMA wire with a continuous coating of variable composition.

FIGS. 11 and 12 illustrate alternative coating embodiments. FIG. 11 shows a wire 48 coated with a continuous coating layer 125 whose thickness progressively increases from one end to another. Such a coating may be made by coating a metal on the wire, for example by plating, while progressively withdrawing the wire from the plating bath. If a non-conductive layer is desired, the metal coating may be oxidized or reacted with a suitable gas at elevated temperature to form an oxide, carbide, nitride or other electrically non-conductive compound.

FIG. 12 shows a coating 135 of generally uniform thickness but progressively varying composition. For example, if the wire is electroplated with an alloy, the composition of the alloy can be varied by changing the current density. Thus by synchronizing removal (or insertion) of the wire from (or into) the electrolyte with a programmed change in the current density driven by a programmed change in voltage, the composition may be systematically varied. Alternatively the wire may be electrodeposited using an anode which is positioned a variable distance from the wire.

Vacuum deposits may be modified by co-depositing from two chemically distinct sources. By synchronizing passage of the wire past the sources with a programmed change in the contribution of each source, a generally uniform but chemically-varying deposit may be applied.

Figure 13:
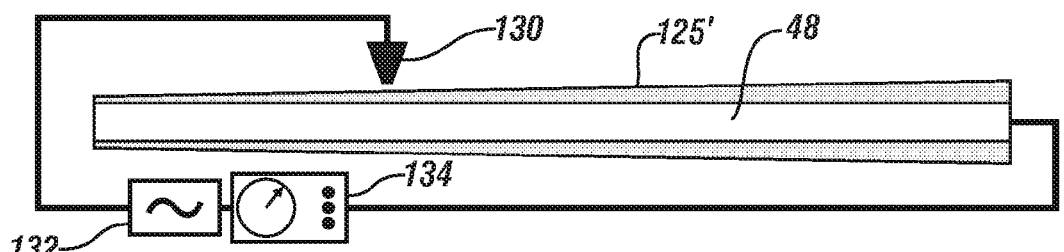
FIG. 13 shows an SMA wire with a continuous coating of variable thickness and a representation of a capacitive sensor.

Such continuous coating layers offer the opportunity for continuous analog absolute positioning measurements without any need for further coding since the thickness variation itself conveys the position information. For example, in the arrangement shown in FIG. 13, the thickness of a variable thickness dielectric coating 125' may be determined by capacitance meter 134 using an alternating current capacitive probe 130 powered by alternating current source 132. In the configuration shown the SMP wire is used as one of the capacitor 'plates', but those skilled in the art will appreciate that separate 'plates' including curved patched capacitive sensors generally conforming to the wire/coating curvature may be employed. Thus, for example, in the configuration shown in FIG. 13, an absolute location may be identified with a particular coating thickness, so that an estimate of the coating thickness, inferred from the measured capacitance, will uniquely identify the wire location. Of course, such analog approaches may also introduce the ubiquitous issues of noise and drift and which may serve to limit the accuracy which may be achieved in practical systems.

With knowledge of the wire position, the location of any actuator or plunger attached to the wire may be determined. So, to render a progressive or continuously variable deployment of an air dam or a rear spoiler on an automobile, as described previously in conjunction with the discussion of FIGS. 4 and 5 it is only necessary to associate a particular extension of the device with a specific wire position and actuate the SMA wire until a specified displacement is achieved. The extent of such required deployment will commonly correlate with vehicle operating conditions including the vehicle operating speed. This may be captured in a look-up table in an on-vehicle controller which may be interrogated at some predetermined interval. Then, for example, when the vehicle speed is such that device deployment is called for, a suitable current may be passed through the SMA wire to at least initiate its transformation to austenite. It is desired to control the extent to which the wire contracts which depends upon the extent of martensite to austenite transformation in the wire, which, in turn, will depend on the wire temperature. But, since the only control parameter is the current flowing through the wire, the look-up table referred to previously should incorporate some guidance on an initial current flow so that deployment is not so rapid as to cause the device to significantly overshoot its intended deployment. Preferably the device will operate under some predetermined actuation current until the device closely approaches its desired deployed position and then control will pass to a controller which will control the instantaneous current supplied to the wire based on wire position. Under conditions where more rapid deployment is required, an initial period high current may be followed by a second period of lesser current until current control, responsive to wire position is implemented. Of course, since the wire temperature is responsive to the balance between resistance heating and heat loss due to conduction, convection and radiation, changes in the wire environment may necessitate repeated adjustment of the applied current at relatively frequent intervals of say every 5 seconds or so.

The above descriptions of embodiments of the invention are intended to illustrate the invention and not intended to limit the claimed scope of the invention.

The invention claimed is:

1. A method of modifying an actuator comprising a temperature-responsive, length-changing linear shape memory alloy element so that a change in element length may be detected and used for detection of movement of the actuator in an article of manufacture in which it is to be employed, the method comprising:

forming a sensible, spatially varying, coating on a selected surface region, or on a plurality of selected surface regions, along the length of the linear shape memory alloy element, the coating embodying at least one spatially varying attribute, adapted to be sensed by one or more compatible magnetic, capacitive, resistive, and optical sensor(s), positioned proximate the element adjacent a predetermined location on the element to detect the spatially varying coating attribute on the selected surface region, or, on the plurality of selected surface regions of the element and generate a signal representative of a change in length of the linear shape memory alloy element and indicative of movement of the actuator in the article of manufacture.

2. The method of claim 1 in which the spatially varying sensible coating is formed on the plurality of surface regions to develop a pattern of coating segments for providing a sequence of sensor signals representing the change in length of the linear shape memory alloy element indicative of movement of the actuator in the article of manufacture.

3. The method of claim 1 in which the spatially varying sensible coating is of variable thickness and the sensor signal is of varying intensity representing the change in length of the linear shape memory alloy element indicative of movement of the actuator in the article of manufacture.

4. The method of claim 1 in which the spatially varying sensible coating is of variable composition and the sensor signal is of varying intensity representing the change in length of the linear shape memory alloy element indicative of movement of the actuator in the article of manufacture.

5. The method of claim 1 in which the spatially varying sensible coating is metallic and deposited, electrochemically or by electroless deposition, from aqueous solution, or is formed by thermal decomposition of a metal salt.

6. The method of claim 5 in which the metallic coating is ferromagnetic.

7. The method of claim 5, further comprising reacting the metal coating with a suitable gas at elevated temperature to form an electrically non-conductive oxide, carbide or nitride.

8. A method of controlling the position of a device in an article of manufacture comprising a compatible sensor, the device being operatively connected to an actuator comprising shape memory alloy wire adapted to undergo change in length under change in temperature, the wire being modified with a sensible, spatially varying coating of a composition, the coating being variable along the length of the wire and having at least one spatially varying attribute adapted to be sensed by the compatible sensor to generate a signal indicative of any change of length of the wire, the sensible spatially varying coating being formed on at least a portion of the wire surface so that the compatible sensor, fixedly positioned at a predetermined location proximate the shape memory alloy wire to detect the spatially varying coating attribute, provides the signal indicative of the change of length of the wire and so of the movement of the actuator and the device, the method comprising:

changing the shape memory alloy wire temperature and sensing the change in length of the shape memory alloy wire by using the compatible sensor to sense the wire sensible coating;

relating the change in length of the wire to the device position; and adjusting the shape memory alloy wire temperature to achieve a preferred device position.

9. The method of claim 8 in which the sensible, spatially varying coating is formed in a pattern of coating segments for providing a sequenced pattern of sensor signals indicative of the change in length of the shape memory alloy wire in the article of manufacture.

10. The method of claim 9 in which the pattern of coating segments varies along the length of the wire in a recognizable manner so that the wire change in length is determined by identifying the sensor signals with the known coating pattern.

11. The method of claim 9 in which the sensible, spatially varying coating is patterned in a regular manner along the length of the wire and wire change in length is determined by detecting and counting the resulting regular variations in sensor signal and identifying such regular sensor signal variations with a like number of coating variations.

12. The method of claim 8 in which the compatible sensor is one or more of a magnetic, optical or capacitive sensor.

13. The method of claim 8 in which the sensible, spatially varying coating is of variable thickness and the sensor signal is of varying intensity reflective of the change of length of the wire.

14. The method of claim 8 in which the sensible, spatially varying coating is of variable composition and the sensor signal is of varying intensity reflective of the change of length of the wire.

15. A system for controlling the position of a substantially reversibly deployable device in an article of manufacture, the system comprising:

a temperature-responsive, length-changing, linear shape memory alloy element as an actuator, the element comprising a formed sensible coating layer on a selected surface region of the element, the coating being variable along the length of the element and of a composition that is formed on the selected surface region so as to provide at least one detectable attribute adapted to be sensed by a fixedly-located, non-contacting, compatible sensor suitably positioned to sense the sensible coating layer and generate an output signal representative of a change in length of the linear shape memory alloy element and indicative of movement of the deployable device;

the shape memory alloy element being fixedly attached at one end and attached to the deployable device at a second end;

the compatible sensor, positioned proximate to, but not contacting, the element adjacent a predetermined location on the element suitable for sensing the detectable attribute in the formed sensible coating layer and providing the output signal;

a power supply for supplying electrical power to the shape memory alloy element to enable resistance heating of the shape memory alloy element;

a controller configured to interpret the sensor output signal to determine the element length and for relating the sensed element length to the deployable device position, and for adjusting the current supplied to the shape memory alloy element by the power supply, to achieve predetermined positioning of the deployable device.

16. The system of claim 15 in which the linear shape memory alloy element is one or more of a wire, a strip, a cable, a braid and a chain.

17. The system of claim 15 in which the sensible coating is formed in a pattern of coating segments so that the output signal provided by the compatible sensor is a time-varying sequence of sensor signals reflective of the movement of the actuator in the article of manufacture.

18. The system of claim 15 in which the sensible coating is metallic and deposited, electrochemically or by electroless deposition, from aqueous solution, or is formed by thermal decomposition of a metal salt.

19. The system of claim 15 in which the metallic coating is ferromagnetic.

20. The system of claim 15 in which the compatible sensor is one or more of a magnetic, capacitive or optical sensor.

* * * * *